United States Patent
Mishra et al.

(10) Patent No.: US 11,947,174 B2
(45) Date of Patent: Apr. 2, 2024

(54) ROLLABLE OPTICAL FIBRE RIBBON WITH INTERMITTENT BONDING

(71) Applicant: Sterlite Technologies Limited, Gurugram (IN)

(72) Inventors: Atul Mishra, Gurugram (IN); Sourabh Singh Panwar, Gurugram (IN)

(73) Assignee: Sterlite Technololgies Limited, Harayana (IN)

(*) Notice: Subject to any disclaimer, the term of this patent is extended or adjusted under 35 U.S.C. 154(b) by 0 days.

(21) Appl. No.: 17/700,499

(22) Filed: Mar. 22, 2022

(65) Prior Publication Data

US 2023/0168452 A1    Jun. 1, 2023

(30) Foreign Application Priority Data

Nov. 26, 2021   (IN) .............................. 202111054820

(51) Int. Cl.
*G02B 6/44* (2006.01)

(52) U.S. Cl.
CPC .......... *G02B 6/4404* (2013.01); *G02B 6/441* (2013.01); *G02B 6/448* (2013.01)

(58) Field of Classification Search
None
See application file for complete search history.

(56) References Cited

U.S. PATENT DOCUMENTS

| 2014/0016905 A1* | 1/2014 | Tanabe | G02B 6/4405 385/114 |
| 2022/0269023 A1* | 8/2022 | Kaneko | G02B 6/448 |

FOREIGN PATENT DOCUMENTS

| WO | WO-2017145955 A1 * | 8/2017 | ........... G02B 6/3636 |
| WO | WO-2022046710 A1 * | 3/2022 | |

OTHER PUBLICATIONS

Translation of WO 2017/145955 (Year: 2017).*

* cited by examiner

*Primary Examiner* — Chad H Smith
(74) *Attorney, Agent, or Firm* — Steven R. Fairchild; Arun Narasani

(57) ABSTRACT

The present disclosure provides a rollable optical fibre ribbon (100) with intermittent bonding. The rollable optical fibre ribbon (100) includes a plurality of optical fibres. The plurality of optical fibres (102) are placed parallel to each other, wherein the plurality of optical fibres (102) adjacent to each other are bonded intermittently along a length by a plurality of bonded portions (104). The plurality of bonded portions (104) occupies 3 to 20% of an area of the rollable optical fibre ribbon of length 1 meter. An area of the plurality of bonded portions (104) is defined as an area projected by the plurality of bonded (104) portions on a plane passing through centres of the plurality of optical fibres (102) of the rollable optical fibre ribbon (100) and extending longitudinally.

12 Claims, 4 Drawing Sheets

ROLLABLE OPTICAL FIBRE RIBBON WITH INTERMITTENT BONDING

TECHNICAL FIELD

The present disclosure relates to the field of optical fibre and, in particular, relates to a rollable optical fibre ribbon with intermittent bonding.

BACKGROUND

With the advancement of science and technology, various modern technologies are being employed for communication purposes. One of the most important modern communication technologies is the optical fiber communication technology using a variety of optical fiber cables. One such type of optical fiber cables are optical fiber ribbon cables. These optical fiber ribbon cables include a large number of optical fiber ribbons. Conventionally, an IBR (Intermittently Bonded Ribbon) includes a plurality of optical fibers placed in parallel and further adjacent optical fibers are bonded intermittently along a length of the optical fibers by a plurality of connecting portions. Additionally, for making high fiber count cables, these ribbons are rolled and then bundled to be placed inside a core. Further, dimension of the plurality of connecting portions is in range of a few millimetres. Furthermore, the ribbons must be mechanically strong enough to withstand handling and manufacturing operations. Moreover, the ribbon must be flexible enough so that it can be easily rolled for packing a large number of ribbons inside the core. However, to meet the above stated requirements, area of the plurality of connecting portions play an important role. There is a need to optimize the area of the plurality of connecting portions with respect to total area of the ribbon to obtain IBRs with good mechanical strength and rollability.

JP6808686B2 discloses an intermittently coupled type optical fiber ribbon including a plurality of optical fibers arranged in a width direction and coupling parts intermittently coupling the two adjacent optical fibers. An inter-center distance between the two adjacent optical fibers is larger than a diameter of the optical fibers, and a total of an amount of volume contraction of the coupling parts per 1 m of the one optical fiber is 0.00070 mm/mx° C. or less. Further, in each of the examples (and comparative examples), the connecting pitch p was set to 50 mm, and the connecting portion length a was set to 10 mm. Furthermore, in each of the examples (and comparative examples), the fiber diameter D is 205 µm, the center-to-center distance L is 280 µm, and the separation distance C is 75 µm.

WO2021133534A1 discloses an optical fiber ribbon. The optical fiber ribbon includes a plurality of optical fibers arranged adjacently to each other and a plurality of bonding regions intermittently spaced along a length of the optical fiber ribbon. At each bonding region, at least one bond is formed between two optical fibers of the plurality of optical fibers. Further, the at least one bond comprises a first material applied to outer surfaces of the two optical fibers and a second material applied over the first material. The first material is different from the second material, and at least one of the first material or the second material includes a colorant configured to identify the optical fiber ribbon. Furthermore, in an aspect, interval A is from 20 mm to 100 mm. Interval B is the spacing between adjacent even and odd bonds, such as the distance between the bond 1-2 and bond 2-3. In some figure, interval B is the midpoint of interval A, i.e., B=0.5 A, which is 10 mm to 50 mm in an aspect, because the even and odd bonds are alternated. Also, some figures also depict a dimension D, which is the length of each bond 16. In an aspect, the length D is from 1 mm to 10 mm. Different aspects of the bonds 16 will be described in greater detail in relation to some figures. Also, disclosed are aspects of making such an optical fiber ribbon as well as of optical fiber cables including such an optical fiber ribbon.

The prior art reference does not mention about optimized bond area on optical fibre ribbon that provides necessary mechanical strength as well as rollability. In light of the above-stated discussion, there exists a need for an optical fibre ribbon that overcomes the above cited drawbacks of the conventional optical fibre ribbon.

OBJECT OF THE DISCLOSURE

A primary object of the present disclosure is to provide a rollable optical fibre ribbon with intermittent bonding.

Another objective of the present disclosure is to provide an IBR with optimized bond area of the rollable optical fibre.

SUMMARY

In an aspect, the present disclosure provides a rollable optical fibre ribbon with intermittent bonding. The rollable optical fibre ribbon includes a plurality of optical fibres. The plurality of optical fibres is placed parallel to each other. The plurality of optical fibres adjacent to each other is bonded intermittently along a length by a plurality of bonded portions. The plurality of bonded portions in 1 meter length of the ribbon occupies 3 to 20% of an area of the rollable optical fibre ribbon of length 1 meter. An area of the plurality of bonded portions is defined as an area projected by the plurality of bonded portions on a plane passing through centres of the plurality of optical fibres of the rollable optical fibre ribbon and extending longitudinally. The area of the rollable optical fibre ribbon is defined as area projected by the optical fibre ribbon on a plane passing through centres of the plurality of optical fibres of the rollable optical fibre ribbon and extending longitudinally.

STATEMENT OF THE DISCLOSURE

The present disclosure provides a rollable optical fibre ribbon with intermittent bonding. The rollable optical fibre ribbon includes a plurality of optical fibres. The plurality of optical fibres are placed parallel to each other, wherein the plurality of optical fibres adjacent to each other are bonded intermittently along a length by a plurality of bonded portions. The plurality of bonded portions in 1 meter length of the ribbon occupies 3 to 20% of an area of the rollable optical fibre ribbon of length 1 meter. An area of the plurality of bonded portions is defined as area projected by the plurality of bonded portions on a plane passing through centres of the plurality of optical fibers of the rollable optical fibre ribbon and extending longitudinally. An area of the rollable optical fiber ribbon is defined as area projected by the ribbon on a plane passing through centres of the plurality of optical fibers of the rollable optical fibre ribbon and extending longitudinally.

BRIEF DESCRIPTION OF THE FIGURES

Figure 1:
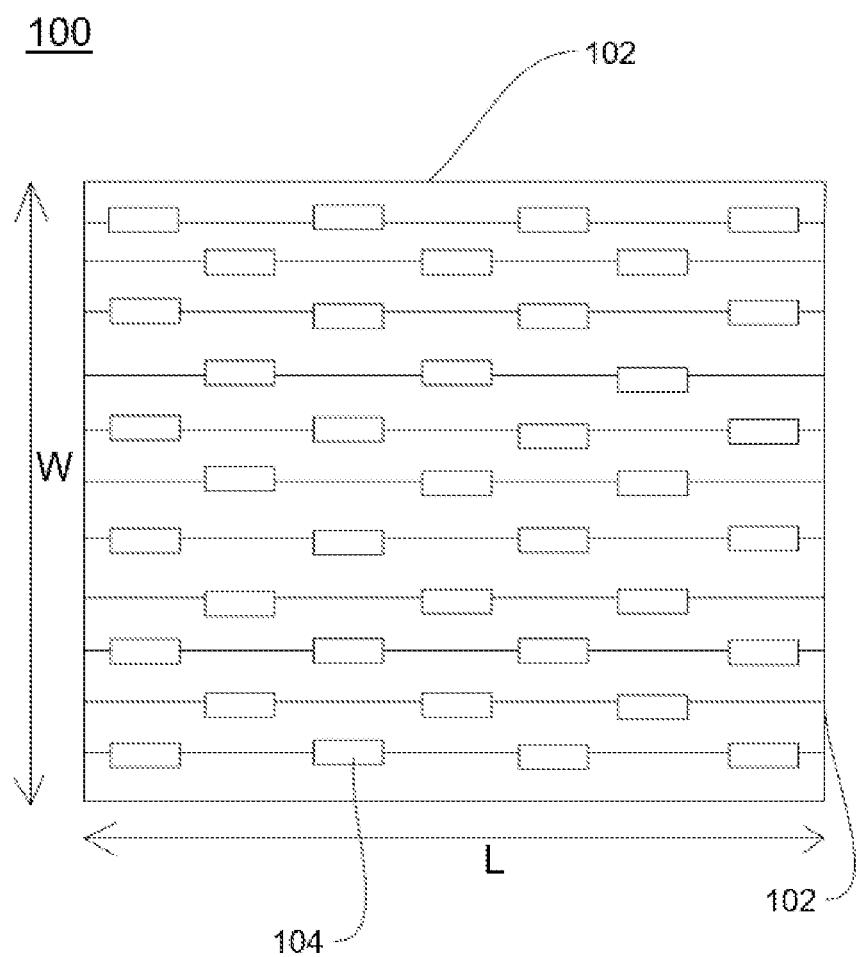
Figure 2:
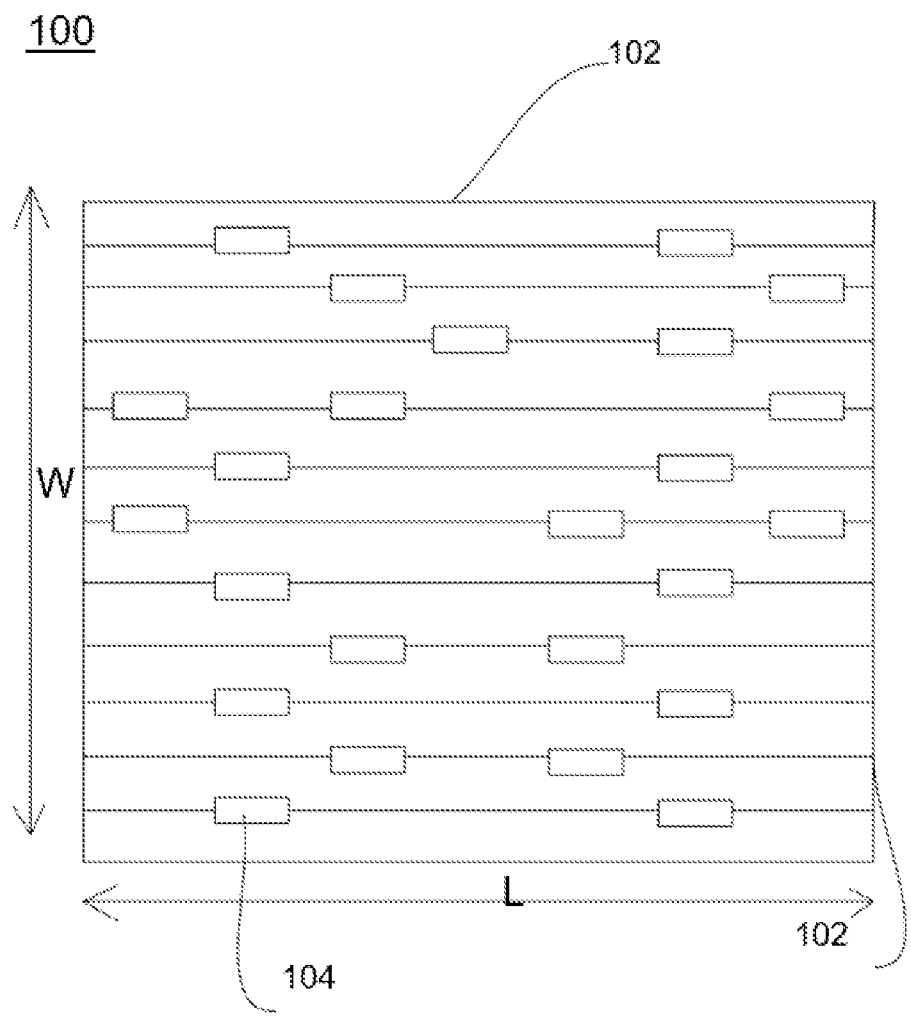
Figure 3:
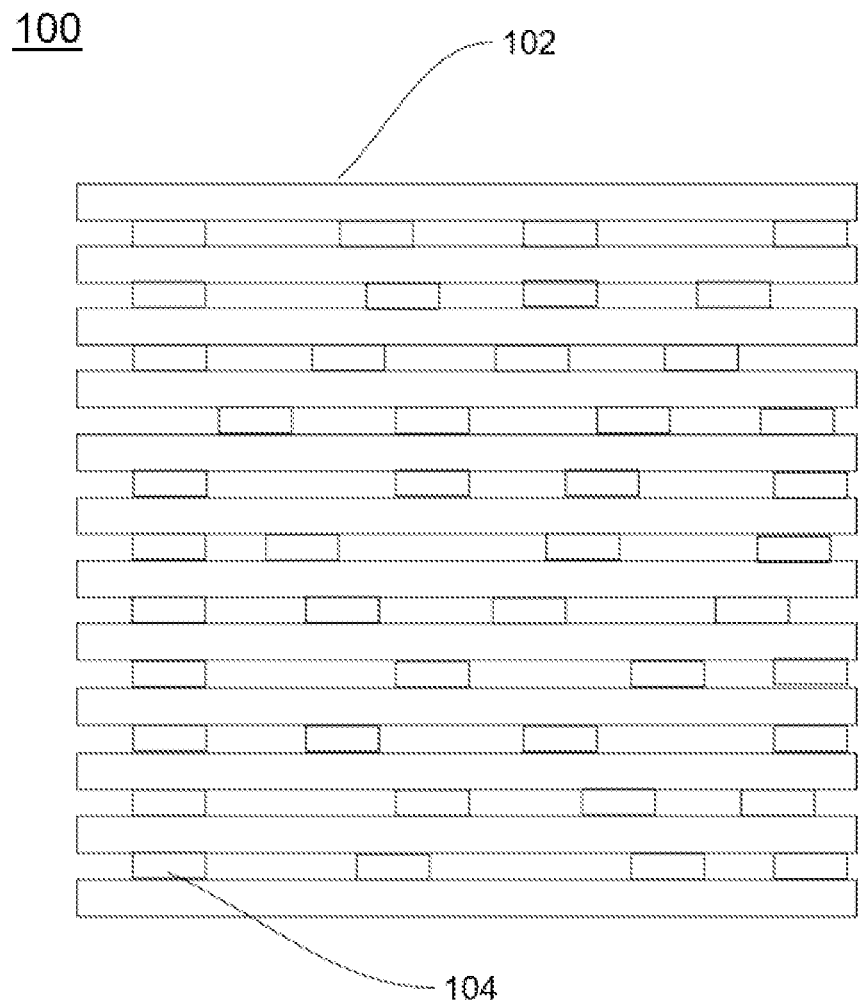
Figure 4:
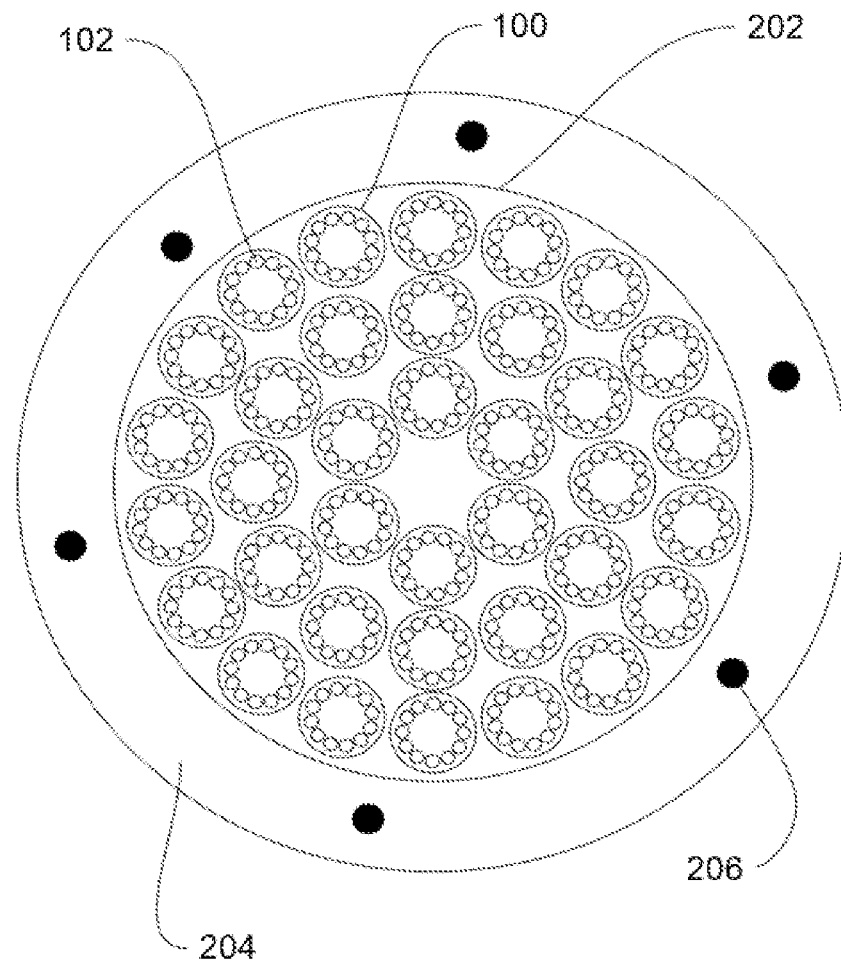

Having thus described the invention in general terms, reference will now be made to the accompanying drawings, which are not necessarily drawn to scale, and wherein:

FIG. 1 illustrates a rollable optical fibre ribbon with intermittent bonding, in accordance with an aspect of the present disclosure;

FIG. 2 illustrates the rollable optical fibre ribbon with intermittent bonding, in accordance with another aspect of the present disclosure;

FIG. 3 illustrates the rollable optical fibre ribbon with gaps between adjacent optical fibres of a plurality of optical fibres, in accordance with yet another aspect of the present disclosure; and FIG. 4 illustrates an example of optical fibre cable, in accordance with an aspect of the present disclosure.

It should be noted that the accompanying figures are intended to present illustrations of exemplary depictions of the present disclosure. These figures are not intended to limit the scope of the present disclosure. It should also be noted that accompanying figures are not necessarily drawn to scale.

DETAILED DESCRIPTION

Reference in this specification to "one aspect" or "an aspect" means that a particular feature, structure, or characteristic described in connection with the aspect is included in at least one aspect of the present technology. The appearance of the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but no other aspects.

Reference will now be made in detail to selected aspects of the present disclosure in conjunction with accompanying figures. The aspects described herein are not intended to limit the scope of the disclosure, and the present disclosure should not be construed as limited to the aspects described. This disclosure may be depicted in different forms without departing from the scope and spirit of the disclosure. It should be understood that the accompanying figures are intended and provided to illustrate aspects of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a rollable optical fibre ribbon 100 with intermittent bonding, in accordance with an aspect of the present disclosure. FIG. 2 illustrates the rollable optical fibre ribbon 100 with intermittent bonding, in accordance with another aspect of the present disclosure. FIG. 3 illustrates the rollable optical fibre ribbon with gaps between adjacent optical fibres of a plurality of optical fibres, in accordance with another aspect of the present disclosure. In general, optical fibre ribbon includes number of optical fibres secured or embedded substantially parallel to one another by coating material. In addition, optical fibre ribbons are enclosed inside optical fibre cables that require high fibre counts within less installation space. The rollable optical fibre ribbon 100 is mechanically robust. In addition, the rollable optical fibre ribbon 100 is capable to withstand handling and manufacturing operations due to the strong mechanical strength. In addition, the rollable optical fibre ribbon 100 is flexible. The flexibility of the rollable optical fibre ribbon 100 allows the rollable optical fibre ribbon 100 to roll easily.

The rollable optical fibre ribbon 100 includes a plurality of optical fibres 102. The plurality of optical fibres 102 are placed parallel to each other. Number of the plurality of optical fibres 102 in the rollable optical fibre ribbon is 12. In addition, number of the plurality of optical fibres 102 in the rollable optical fibre ribbon 100 may vary. Each of the plurality of optical fibers 102 has a primary coating with a thickness of at most 130 micron and in-situ modulus of less than 0.6 mega pascals. Further, the thickness of the primary coating of the plurality of optical fibres 102 may vary. The value of in-situ modulus of the primary coating of the plurality of optical fibres 102 may vary. Furthermore, each of the plurality of optical fibers 102 has an attenuation of at most 0.3 decibel per kilometer at a wavelength of about 1550 nanometer. The attenuation may vary depending upon the change in wavelength. The plurality of optical fibres 102 is coated with at least one of water-swellable material, fire-resistant material, and an identification material.

The plurality of optical fibres 102 adjacent to each other are bonded intermittently along a length by a plurality of bonded portions 104. The plurality of bonded portions 104 in a length L of the ribbon occupies 3 to 20% of an area of the rollable optical fibre ribbon 100 of the length L. The length L of the rollable optical fibre ribbon is about 1 meter. In addition, an area of the plurality of bonded portions 104 and is defined as an area projected by the plurality of bonded portions on a plane passing through centres of the plurality of optical fibers 102 of the rollable optical fibre ribbon 100 and extending longitudinally. The area of the rollable optical fibre ribbon 100 is defined as an area projected by the ribbon on a plane passing through centres of the plurality of optical fibers 102 of the rollable optical fibre ribbon 100 and extending longitudinally. In an example, the plurality of bonded portions 104 occupy an area of 9 to 20% of the rollable optical fibre ribbon 100 when width of the plurality of bonded portion 104 of the rollable optical fibre ribbon 100 is more than equal to 125 microns. In another example, the plurality of bonded portions occupy an area of 3 to 9% of the rollable optical fibre ribbon 100 when width of the plurality of bonded portion 104 of the rollable optical fibre ribbon 100 is less than equal to 125 microns. The width of the connecting portions may vary. The connecting portions may have an arbitrary shape depending upon settling down of the matrix material before curing process. The area of the plurality of bonded portions 104 is calculated of a shape as seen from a top view of FIG. 1.

Each of the plurality of bonded portions 104 is followed by an un-bonded portion. Each of the plurality of bonded portions 104 has one of convex shape, concave shape, and flat shape. The plurality of bonded portions 104 may have any suitable shape of the like. Further, shape of the plurality of bonded portions 104 depend upon properties of matrix material and curing conditions. The matrix material is used to hold the plurality of optical fibres 102 together in the rollable optical fibre ribbon 100. Furthermore, each bond of the plurality of bonded portions 104 have a bond width of less than diameter of each of the plurality of optical fibres 102 in the rollable optical fibre ribbon 100. Each bond of the plurality of bonded portions 104 is defined by a bond length and a bond width. The plurality of bonded portions may be arranged in any pattern (as shown in FIG. 2) in the rollable optical fibre ribbon 100. The distance between two bonds of the plurality of bonded portions 104 may be same. The distance between two bonds of the plurality of bonded portions 104 may be different.

The area of the rollable optical fibre ribbon 100 is calculated as:

Ribbon Area=Ribbon width*1 meter

The area of one bond area is calculated as:

Area of bond=Bond width*Bond Length

The total bond area of the plurality of bonded portions 104 is calculated as:

Total bond area=Σ(Area of bond in meter length L of the ribbon)

The bond ratio is calculated as:

Bond Ratio=Total Bond area*100/Ribbon Area

The rollable optical fibre ribbon 100 has a height of at most 270 microns. The height of the rollable optical fibre ribbon 100 may vary. The height of the ribbon is greater than diameter of each of the plurality of optical fibres if the matrix material is elevated above surface of the optical fibre. The height of the rollable optical fibre ribbon 100 is less than diameter of each of the plurality of optical fibres 102 if the matrix material is below surface of the optical fibre. The optical fibre refers to a single optical fibre of the plurality of optical fibres 102. The rollable optical fibre ribbon 100 has a width W.

In an example, the width W of the rollable optical fibre ribbon 100 with fibre diameter 250 micrometer is:

Width W of 12 fibres=12*0.25=3 mm

In another example, the width W of the rollable optical fibre ribbon 100 with fibre diameter 160 micrometer is:

Width W of 12 fibres=12*0.16=1.92 mm

In yet another example, the width W of the rollable optical fibre ribbon 100 with fibre diameter 200 micrometer is:

Width W of 12 fibres=12*0.20=2.4 mm

In an example, the number of plurality of bonded portions 104 is 250 in 1m length of the rollable optical fire ribbon 100. The rollable optical fibre ribbon 100 have 12 fibres of diameter 250 micrometer of each of the plurality of fibres 102 and 250 micron pitch between the each of the plurality of fibres 102. The bond between each of the plurality of fibres 102 is of length 10 mm and width 130 micron. The Area of the bond is:

Area of the bond=Number of bonds*length*width

Area of the bond=250*10*0.13=325 mm square

Width of the rollable optical fibre ribbon 100=12*0.25=3 mm

Length of the rollable optical fibre ribbon 100=1 m

Area of the rollable optical fibre ribbon 100=3*1000=3000 meter square

Bond Area Ratio=325*100/300=11%

In another example, the number of plurality of bonded portions 104 is 250 in 1 m length of the rollable optical fire ribbon 100. The rollable optical fibre ribbon 100 have 12 fibres of diameter 200 micrometer of each of the plurality of fibres 102 and 200 micron pitch between the each of the plurality of fibres 102. The bond between each of the plurality of fibres 102 is of length 10 mm and width 140 micron. The Area of the bond is:

Area of the bond=Number of bonds*length*width

Area of the bond=250*10*0.14=350 mm square

Width of the rollable optical fibre ribbon 100=12*0.20=2.4 mm

Length of the rollable optical fibre ribbon 100=1 m

Area of the rollable optical fibre ribbon 100=2.4*1000=3000 meter square

Bond Area Ratio=350*100/2400=15%

The pitch of the rollable optical fibre ribbon 100 is substantially equal to the diameter of each of the plurality of optical fibres 102. The adjacent optical fibers are in contact with each other in the rollable optical fibre ribbon 100 (as shown in FIG. 1). Alternately, the rollable optical fibre ribbon 100 has gaps between adjacent optical fibres of the plurality of optical fibres 102 (as shown in FIG. 3). The rollable optical fibre ribbon 100 has a pitch substantially larger than diameter of each of the plurality of optical fibres 102. In general, pitch is distance between centres of two consecutive optical fibres. The pitch of the rollable optical fibre ribbon 100 is equal to diameter of the optical fibre if the adjacent optical fibers are in contact with each other (as shown in FIG. 1). The pitch of the rollable optical fibre ribbon 100 is greater than diameter of the optical fibre if there is a gap between adjacent optical fibres of the plurality of optical fibres 102 (as shown in FIG. 3). The rollable optical fibre ribbon 100 may be coated with water swellable yarn. The rollable optical fibre ribbon 100 may be coated with fire resistant material. The rollable optical fibre ribbon 100 may be coated with any identification material.

FIG. 4 illustrates an example of an optical fibre cable 200, in accordance with an aspect of the present disclosure. The optical fibre cable 200 is a high fibre count cable. The optical fibre cable 200 includes a core 202, a sheath layer 204 and a plurality of strength members 206. The sheath layer 204 surrounds the core 202. The sheath layer 204 is an outer most layer of the optical fibre cable 200. The sheath layer 204 provides protection to the optical fibre cable 200 from environmental conditions. The plurality of strength members 206 is embedded inside the sheath layer 204 along the length of the optical fibre cables 200. The strength member 206 provides improved mechanical strength and protection from environmental conditions. The environmental conditions include but may not be limited to rainfall, snowfall, wind, and sunlight.

The core 202 includes a plurality of rollable optical fibre ribbons. Each of the plurality of rollable optical fibre ribbons corresponds to the rollable optical fibre ribbon 100 of FIG. 1, 2 or 3. The plurality of rollable optical fibre ribbons are rolled and bundled together to place inside the core 202 of the optical fibre cable 200. The plurality of rollable optical fibre ribbons is mechanically robust enough to withstand handling and manufacturing operations. Additionally, each of the plurality of rollable optical fibre ribbons is also flexible and may be rolled easily for packing large number of the plurality of rollable optical fibre ribbons in the core 202 of the optical fibre cable 200. The area of bonds of the plurality of bonded portions 104 of the rollable optical fibre ribbon 100 is optimized to obtain strong mechanical strength and rollability.

In an example, number of the plurality of optical fibres 102 in the core 202 of the optical fibre cable 200 is 432 (as shown in FIG. 4). Number of the plurality of optical fibres 102 in the core 202 of the optical fibre cable 200 may be 6912. Number of the plurality of optical fibres 102 in the core 202 of the optical fibre cable 200 may vary. The optical fibre cable 200 has high packing density. The optical fiber cable 200 may have one or more loose tubes containing a plurality of optical fiber ribbons 100.

The foregoing descriptions of pre-defined aspects of the present technology have been presented for purposes of illustration and description. They are not intended to be exhaustive or to limit the present technology to the precise forms disclosed, and obviously many modifications and variations are possible in light of the above teaching. The aspects were chosen and described in order to best explain the principles of the present technology and its practical application, to thereby enable others skilled in the art to best utilize the present technology and various aspects with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. A rollable optical fibre ribbon with intermittent bonding, the rollable optical fibre ribbon comprising:
   a plurality of optical fibres, wherein the plurality of optical fibres are placed parallel to each other, wherein the plurality of optical fibres adjacent to each other are bonded intermittently along a length by a plurality of bonded portions, wherein the plurality of bonded portions occupies 3 to 20% of an area of the rollable optical fibre ribbon of length of 1 meter; and
   wherein an area of the plurality of bonded portions is defined as an area projected by the plurality of bonded portions on a plane passing through centres of the plurality of optical fibres of the rollable optical fibre ribbon and extending longitudinally, wherein the area of the rollable optical fibre ribbon is defined as area projected by the optical fibre ribbon on a plane passing through centres of the plurality of optical fibres of the rollable optical fibre ribbon and extending longitudinally.

2. The rollable optical fibre ribbon as claimed in claim 1, wherein each of the plurality of bonded portions is followed by an unbonded portion.

3. The rollable optical fibre ribbon as claimed in claim 1, wherein each of the plurality of bonded portions has one of convex shape, concave shape, and flat shape.

4. The rollable optical fibre ribbon as claimed in claim 1, wherein the rollable optical fibre ribbon has a height of at most 270 microns.

5. The rollable optical fibre ribbon as claimed in claim 1, wherein each of the plurality of bonded portions have a bond width of less than a diameter of each of the plurality of optical fibres in the rollable optical fibre ribbon.

6. The rollable optical fibre ribbon as claimed in claim 1, wherein each of the plurality of optical fibers has a primary coating with a thickness of at most 130 micron and in-situ modulus of less than 0.6 mega pascals.

7. The rollable optical fibre ribbon as claimed in claim 1, wherein each of the plurality of optical fibers has an attenuation of at most 0.3 decibel per kilometer at a wavelength of about 1550 nanometer.

8. The rollable optical fibre ribbon as claimed in claim 1, wherein the plurality of optical fibres is coated with at least one of water-swellable material, fire-resistant material, and an identification material.

9. The rollable optical fibre ribbon as claimed in claim 1, wherein the rollable optical fibre ribbon has a pitch substantially larger than a diameter of each of the plurality of optical fibres.

10. The rollable optical fibre ribbon as claimed in claim 1, wherein the rollable optical fibre ribbon has a pitch substantially the same as a diameter of each of the plurality of optical fibres.

11. The rollable optical fibre ribbon as claimed in claim 1, wherein the plurality of bonded portions occupy an area of 9 to 20% of the rollable optical fibre ribbon, wherein the plurality of bonded portions comprises connecting portions with width of at least 125 microns.

12. The rollable optical fibre ribbon as claimed in claim 1, wherein the plurality of bonded portions occupy an area of 3 to 9% of the rollable optical fibre ribbon 7 wherein the plurality of bonded portions comprises connecting portions with width of at most 125 microns.

* * * * *